Figure 1:
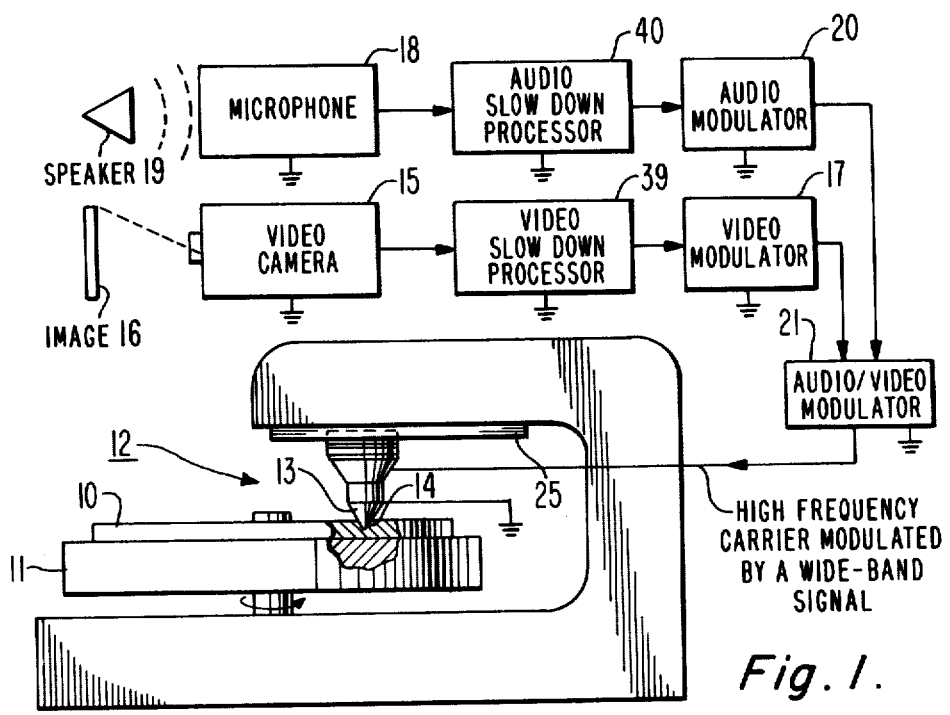

United States Patent [19]

Gunter

[11] 4,310,915
[45] Jan. 12, 1982

[54] DUAL PARALLELOGRAM CUTTERHEAD SUSPENSION APPARATUS

[75] Inventor: John Gunter, Indianapolis, Ind.

[73] Assignee: RCA Corporation, New York, N.Y.

[21] Appl. No.: 106,524

[22] Filed: Dec. 26, 1979

[51] Int. Cl.³ .................... G11B 17/00; G11B 21/16
[52] U.S. Cl. .................................. 369/251; 369/248; 369/246
[58] Field of Search ............... 360/100.4 C; 274/13R, 274/23 R, 23 A, 46; 369/244–248, 251, 253

[56] References Cited

U.S. PATENT DOCUMENTS

| Re. 29,113 | 1/1977 | Halter ........................... 358/128 |
| 2,845,802 | 8/1958 | Brown, Jr. et al. ............. 274/13 R |
| 3,023,011 | 2/1962 | Wagner ........................... 274/13 R |
| 3,490,771 | 1/1970 | Bauer ........................... 179/100.4 C |
| 3,572,724 | 3/1971 | Rabinow ........................ 274/13 R X |
| 3,835,262 | 9/1974 | Moritz et al. ................ 179/100.4 C |
| 3,963,861 | 6/1976 | Crooks ........................... 274/23 A X |
| 4,030,815 | 6/1977 | Andrevski et al. ............. 350/255 |
| 4,035,590 | 7/1977 | Halter ........................ 179/100.41 P |
| 4,059,277 | 11/1977 | DeStephanis .................. 274/23 A |
| 4,060,831 | 11/1977 | Halter ........................... 358/128 |
| 4,120,504 | 10/1978 | Brecht ........................... 274/23 A |
| 4,131,284 | 12/1978 | Rangabe ......................... 274/23 R |
| 4,135,722 | 1/1979 | Paulson et al. ................ 274/23 A |

*Primary Examiner*—Aristotelis M. Psitos
*Attorney, Agent, or Firm*—E. M. Whitacre; J. S. Tripoli; J. E. Roehling

[57] ABSTRACT

A cutting stylus assembly for electromechanically recording short wavelength video signal information in a metal master is supported in a cutterhead suspension apparatus. In the suspension head apparatus the cutting stylus assembly is supported by an air puck device so that the stylus cuts an information track having a given quiescent depth. Two sets of parallel spring steel suspension members are used to mount the cutting stylus assembly and air puck to an electromechanical recording lathe. These suspension members are used to control the cutting stylus assembly and air puck motion, to maintain a fixed stylus assembly to air puck plane relationship and to effect a variable preload for the cutting stylus system.

7 Claims, 3 Drawing Figures

DUAL PARALLELOGRAM CUTTERHEAD SUSPENSION APPARATUS

The present invention relates generally to apparatus for recording short wavelength modulation in a substrate and more particularly to electromechanical recording apparatus advantageously employed in the formation of a high density information record, such as a video disc record.

In certain high density information record/playback systems, information is recorded as relatively short geometric variations (e.g., 0.6–1.6 micrometers) along the length of an information track. In one specific but nonlimiting embodiment, these short geometric variations may represent, for example, a composite color video signal. There are several methods of recording a composite color video signal in an information track comprising such geometric variations. Illustratively, the method of recording may be of a type shown in U.S. Pat. No. 4,044,379 of J. B. Halter, issued Aug. 23, 1977, entitled "METHOD AND APPARATUS FOR ELECTROMECHANICAL RECORDING OF SHORT WAVELENGTH MODULATION IN A METAL MASTER." Pursuant to the Halter method, a first carrier (e.g., video) is frequency modulated over a high frequency deviation range (e.g., of the order of 4.8–6.8 MHz) in accordance with a video signal including the luminance and chrominance components of a scanned image. A second carrier is frequency modulated over a low frequency deviation range (e.g., of the order of 716 ±50 KHz) in accordance with the audio signal accompaniment of the video signal. An electromechanical recording apparatus responsive to the first and second carriers records short wavelength variations representative of the time variations of the recorded signal in a metal master.

Ordinarily, a stamper (having a negative track) is obtained from the recorded master (having a positive track) from which plastic disc records (also having positive tracks) can then be molded. To recover the prerecorded signals upon playback, appropriate relative motion is established between the disc record and a track following signal pickup which is responsive to the spacial variations passing underneath. The signal pickup may be of any suitable variety (for example, a capacitive or pressure type, etc.). Reference may be made to U.S. Pat. No. 3,842,194 issued to J. K. Clemens on Oct. 15, 1974 and entitled "INFORMATION RECORDS AND RECORDING/PLAYBACK SYSTEMS THEREFOR," for an illustration of a playback apparatus including a capacitive type of a signal pickup. Pursuant to the Clemens system, a disc record is provided with a thin deposit of dielectric material overlying a fine coating of conductive material on the base of the disc record. In another format, not disclosed in the Clemens patent, the disc may be formed of a conductive material, such as carbon, in a PVC base. In the Clemens system, the playback stylus has a groove-engaging tip incorporating a conductive electrode and the disc record is rotated at an appropriate speed. The variations in the capacitance exhibited between the stylus electrode and the disc record in accordance with the signal recorded in the groove bottom are detected by a detector which is responsive to these capacitance variations and which reconstructs the prerecorded signal for audio/visual presentation on an ordinary television receiver.

In the above type of video disc system, in order to obtain adequate bandwidth for the signal recovered from the grooved disc record during playback (1) the disc record is rotated at a relatively high playback speed (e.g., 450 rpm) and (2) the wavelength of the modulation in the disc record groove is relatively short (e.g., 0.6–1.6 micrometers) as compared with conventional audio disc systems.

Since the playback time is directly proportional to the number of grooves per inch in the disc record and inversely proportional to the playback speed of the disc record, a high playback speed (illustratively, 450 rpm) results in a large number of grooves per inch in the disc record (illustratively, 9600 gpi) for a given playback time (illustratively, 1 hour on each side). In other words, in the aforesaid type of video disc system, the groove convolutions are very closely spaced (e.g., 2.6 micrometers) in order to accommodate the information necessary for storing a video program of an acceptable quality and a reasonable playback time. The close spacing of the groove convolutions in the video disc type record results in a groove having a very small quiescent (without groove modulation) depth (e.g., 0.5 micrometers with a groove apex angle of 140°).

It is desirable to electromechanically record high density information signals into a metal master for obtaining a recording which has a high video signal-to-noise ratio (illustratively, above 48 db peak-to-peak video/rms noise) with a low recording level (e.g., 0.8 micrometer), when the wavelength of the groove modulation, due to the recorded signal, is kept relatively short (illustratively 0.6–1.6 micrometers).

A variety of approaches to disc recording exist in the prior art. For example, electromechanical processes are known in the audio industry for recording groove modulation representative of an audio signal (e.g., having a bandwidth of 20 KHz) in a lacquer master.

A cutterhead for electromechanically recording a video signal in a master substrate is described in U.S. Pat. No. Re. 29,113, issued to J. B. Halter on Jan. 11, 1977 entitled "TRIANGULAR PIEZOELECTRIC TRANSDUCER FOR RECORDING VIDEO INFORMATION." Further, a wideband electromechanical recording system for recording video signals into a disc master is described in U.S. Pat. No. 4,060,831, issued to J. B. Halter on Nov. 29, 1977 entitled "WIDEBAND ELECTROMECHANICAL RECORDING SYSTEM."

In U.S. Pat. No. 3,835,262 issued to S. N. Moritz et al. on Sept. 10, 1974 entitled "VIDEO DISC CUTTING USING PRESSURIZED AIR TO CONTROL DEPTH OF GROOVES" an electromechanical video disc cutting apparatus having an air puck for controlling the depth of cut is described. In the system therein described a platen member which is hinged to the recording lathe at one end supports the cutting stylus and air puck. In operation, the pressure of the air to the air puck is adjusted to support the platen assembly (i.e., platen member, air puck and stylus) at a height sufficient to cut grooves to a reference depth. Since the platen assembly is hinged at one end in the Moritz apparatus the cutting stylus swings in an arc such that the angle which the cutting face of the stylus makes with the disc master may vary in accordance with surface variations of the master and thereby the quality of cut may be detrimentally affected. In a similar manner the hinged arrangement affects the parallelism between the bottom face of the air puck and the disc surface. When the air puck face is not parallel to the disc, surface air may escape at different rates from one side of the air puck compared to the other side thus affecting the depth of cut.

In accordance with the principles of the present invention a cutterhead suspension apparatus is provided which maintains the desired parallelism between the master surface and a stylus support mechanism and in addition, controls the angle of the cutting face of the stylus with respect to the master surface.

An apparatus for electromechanically recording short wavelength information signals in a substrate by mechanical cutting, pursuant to the present invention, includes means for cutting undulations representative of the information signals in a surface of a substrate. The cutting means has a tip and the undulations are cut by the tip into the surface of the substrate at a given nominal depth. Further, the apparatus includes means for supporting the cutting means such that the cutting means cuts into the substrate surface at the given nominal depth and means for maintaining a surface of the supporting means parallel to the surface of the substrate.

According to a further feature of the invention, a means is provided for maintaining a given relationship between the tip of the cutting means and the supporting means such that the cutting means cuts a groove in the substrate having a bottom which undulates in a manner which is a substantially faithful representation of the information signals which are being recorded. Further, the apparatus includes a means for adjusting the relationship maintaining means such that the cutting means cuts a groove in the substrate surface at the given nominal depth.

Figure 3:
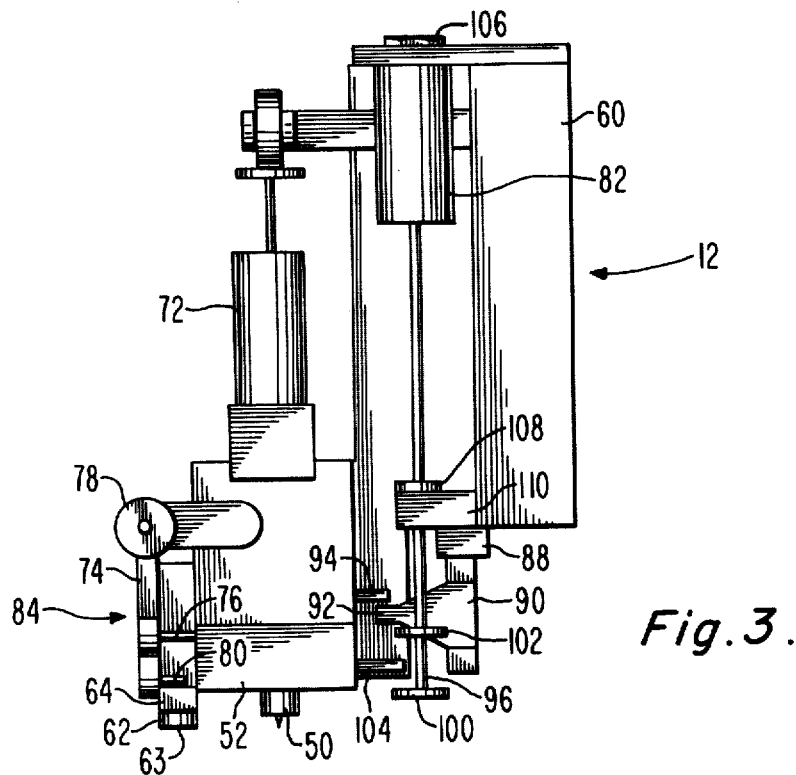
Figure 2:
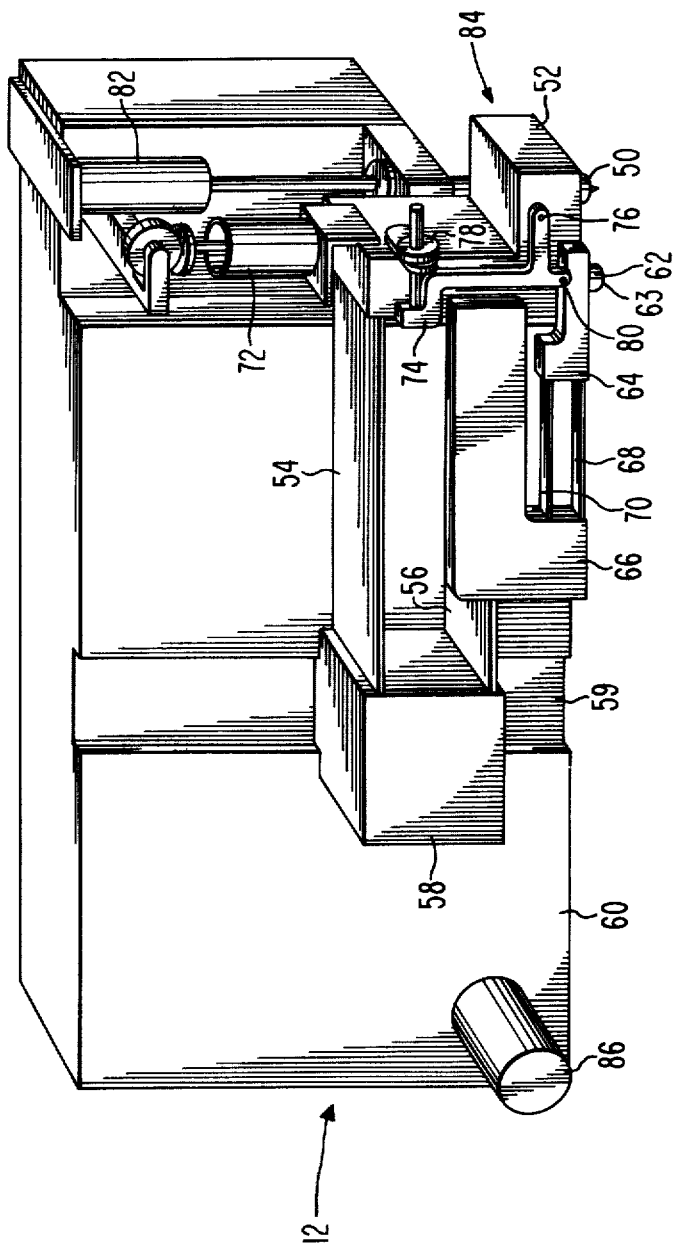

Other features and advantages of the invention will be more fully understood from the following detailed description of the preferred embodiment, the appended claims, and the accompanying drawings in which:

FIG. 1 illustrates, partly via a block diagram representation, a system for electromechanically cutting a groove in a metal master having an information track comprising short wavelength modulation of groove depth pursuant to the principles of the present invention; and FIGS. 2 and 3 illustrate, respectively, a perspective and a front view of the suspension apparatus for use with the system of FIG. 1 pursuant to the principles of the present invention.

FIG. 1 illustrates a system for electromechanically cutting a groove in a metal master 10 having an information track comprising short wavelength modulations of groove depth. The metal master 10 is placed on turntable 11 in operating relationship with suspension head 12 including a diamond stylus 13. The cutting stylus 13 is positioned with respect to the metal master 10 such that a groove 14 having a quiescent groove depth less than 1 micrometer is cut while relative motion is established between stylus 13 and metal master 10. In one preferred arrangement, head suspension 12 is moved linearly on slide 25 while turntable 11 is rotated such that stylus 13 cuts a spiral groove in a disc shaped metal master. The cutting stylus 13 is vibrated in response to a relatively high frequency signal (e.g., approximately 5 MHz) while cutting the groove in order to effect short wavelength modulation of the groove depth having a peak-to-peak dimension which is typically less than the groove depth. The electromechanical recording of short wavelength modulation in a metal master provides a high signal-to-noise ratio.

The formation of the relatively high frequency signal (the time variation of which is represented by the spatial variation in the groove bottom) will now be described with reference to FIG. 1 by way of example only. Illustratively, a video camera 15 scans an image 16 for developing a video signal at the output thereof. The video signal may include components representative of the luminance and chrominance of the scanned image 16. The output signal of the video camera 15 is sloweddown (e.g., by a factor of two) by a video slow-down processor 39 in order to accommodate the bandwidth of the cutterhead. A video modulator 17, coupled to the video slow-down processor 39, frequency modulates a slowed-down high frequency carrier over a high frequency deviation range (e.g., of the order of 4.8/2–6.8/2 MHz) in accordance with the slowed-down video signal.

Simultaneously, a microphone 18 picks up an audio signal accompaniment of the video signal from a speaker 19. The output signal of the microphone 18 is likewise slowed-down (e.g., also by a factor of two) by an audio slow-down processor 40 in order to synchronize the audio signal with the slowed-down video signal. An audio modulator 20, coupled to the audio slow-down processor 40, frequency modulates a sloweddown low frequency carrier over a low frequency deviation range (e.g., of the order of 716/2 ±50/2 KHz) in accordance with the slowed-down audio signal developed at the output of the microphone 18. An audio/video modulator 21 modulates the once-modulated, slowed-down, high frequency carrier in accordance with the once-modulated, slowed-down, low frequency carrier as described in the aforementioned U.S. Pat. No. 4,044,379 to Halter. A relatively high frequency signal at the output of the audio/video modulator 21 energizes cutting stylus 13 during the recording operation in order to effect short wavelength modulation of groove depth (e.g., 0.6–1.6 micrometers) while cutting groove 14 in metal master 10 at a slowed-down recording speed (e.g., 450/2 rpm).

The suspension head 12 described with reference to FIG. 1 is shown in more detail in the perspective view of FIG. 2 and the front view of FIG. 3. Cutting stylus assembly 50 which may be of a type described in the aforementioned Halter U.S. Pat. No. Re 29,113 patent is mounted to mounting block 52 which, in turn, is mounted via spring steel members 54, 56 to mounting block 58. Base 60 provides a structure suitable for mounting to slide 25 of FIG. 1 and for suspending mounting block 52 via spring members 54, 56 and mounting block 58. Resiliently suspended from mounting block 52 is air puck 62 (the air supply is not shown). The air puck 62 which is mounted to mounting block 64 is attached to arm 66 via spring steel members 68, 70. Additionally, mounting block 52 is attached to base 60 through an oil damper mechanism 72. The vertical position of base 63 of air puck 62 relative to the tip of cutting stylus assembly 50 may be adjusted by lever 74 which is pivoted on pin 76. When screw 78 is turned forcing lever 74 to rotate in a counterclockwise direction about pin 76, pin 80 urges mounting block 64, and thereby air puck 62, down. On the other hand when screw 78 is turned in the opposite direction air puck 62 is urged up by the biasing force of spring members 68, 70.

In operation the suspension head 12 controls the depth of cut made by the diamond stylus attached to cutting stylus assembly 50. Mounting block 52 is lowered slowly (the lowering velocity of block 52 is controlled by air dashpot 82 which will be discussed in greater detail herein) until the base 63 of air puck 62 is a few micrometers from the disc surface (not shown in FIG. 2) i.e., until the air pressure between base 63 of air puck 62 and the recording master surface equalizes the gravitational force of suspension assembly 84. It should be noted that before suspension assembly 84 is lowered, lever 74 is adjusted such that stylus assembly 50 will not engage the metal master when the air puck is in its lowered position. With air puck 62 riding a few micrometers above the metal master surface screw 78 is adjusted so that tip of cutting stylus assembly 50 is nearly touching the surface of the metal master thus placing cutting stylus assembly 50 in a ready position. To start a cut, the air pressure to air puck 62 is decreased causing the tip of stylus assembly 50 to enter the metal master surface to a quiescent depth (illustratively, the nominal depth of cut is approximately 0.5 $\mu$m).

With the parallel beam arrangement as illustrated in FIG. 2, the active surface (i.e., base 63) of air puck 62 may be maintained parallel to the surface of a metal master and simultaneously the angle that stylus assembly 50 makes with a metal master surface may be maintained substantially constant such that the undulations cut into the bottom of an information track are a substantially faithful representation of the information signals. Further, the relative position of base 63 with respect to the tip of stylus assembly 50 may be adjusted by screw 78 without affecting the parallelism of base 63 or the angle of stylus assembly 50.

Stray mechanical resonances may be deleterious to the recording process. In order to reduce such undesired resonances, spring steel members 54, 56, 68, 70 may be coated with a vibration damping compound such as Sound-Off, a product of Quaker State Refining Corp. Additionally, oil dashpot 72 aids in reducing any unwanted resonances.

In the embodiment shown in FIG. 2, slot 59 which is illustrated in base 60 permits vertical movement of mounting block 58 on base 60. The preload (i.e., bias) of spring steel members 54, 56 may be adjusted by varying the vertical position of mounting block 58.

Mounted on the side of base 60 is a motor 86 which is used to lift suspension assembly 84 out of contact with the metal master when a recording is complete. The operation of this lifting mechanism as well as dashpot 82 will be explained now with reference to FIG. 3.

FIG. 3 illustrates a front view of the suspension head 12 shown in FIG. 2. After a master has been cut, motor 86 is activated to rotate cam 88 which engages lever 90. Lever 90 is pivoted on the side of base 60 such that as cam 88 is rotated tip 92 of lever 90 moves up contacting pin 94 which, in turn, raises suspension assembly 84. When the stylus is lowered, motor 86 is activated such that lever 90 moves out of engagement with pin 94.

To reduce the rate of descent of suspension assembly 84, a head suspension velocity governor is provided. The head suspension velocity governor comprises air dashpot 82, shaft 96, discs 100, 102 and pin 104. In operation assembly 84 is released by lever 90. After being released it descends effectively in a free fall condition until pin 104 contacts disc 100 of the head suspension velocity governor. When pin 104 comes down into contact with disc 100, the remaining travel of suspension assembly 84 proceeds under the influence of dashpot 82. The suspension assembly 84 now descends very slowly (compared to free fall) until air puck 62 supports it on the metal master surface. Valve 106 of dashpot 82 may be adjusted to vary the rate of descent of assembly 84.

Disc 102 combined with pin 104 provides a system for cocking dashpot 82. When assembly 84 is lifted by lever 90, dashpot 82 is prepared for the next lowering by lifting shaft 96, and thereby the plunger (not shown) of dashpot 82, with pin 104 which contacts disc 102.

In the recording position, shaft 96 should be positioned such that discs 100 and 102 do not interfere with pin 104. For that reason, stop 108 is arranged on shaft 96 to rest on bracket 110, permitting assembly 84 and pin 104 freedom of movement with respect to discs 100, 102.

What is claimed is:

1. Apparatus for electromechanically recording information signals in a substrate comprising:
   means for cutting undulations representative of information signals in a surface of said substrate, said cutting means having a tip, said undulations being cut in said substrate about a given nominal depth;
   means for supporting said cutting means such that said cutting means cuts into said substrate surface to said given nominal depth;
   means for maintaining a substantially parallel relationship between a surface of said supporting means and a surface of said substrate, said parallel maintaining means including a first pair of parallel resilient members;
   means for maintaining a given relationship between said tip of said cutting means and said supporting means, said relationship maintaining means including a second pair of parallel resilient members; and
   means for adjusting said relationship maintaining means such that said cutting means cuts into said substrate to said given nominal depth.

2. Apparatus according to claim 1 wherein said first and second pair of parallel resilient members are formed of spring steel.

3. Apparatus according to claim 2 wherein said spring steel members are coated with a vibration damping material.

4. Apparatus according to claim 2 further comprising:
   a base;
   a first mounting block for mounting said cutting means; and
   a second mounting block mounted to said base;
   said second mounting block being coupled to said first mounting block by said first pair of parallel resilient members; and
   said second mounting block being vertically adjustable with respect to said base such that the pressure applied by said cutting means on said substrate varies as said second mounting block is adjusted.

5. Apparatus according to claim 4 wherein said cutting means comprises a diamond stylus having said tip and a piezoelectric transducer coupled to said diamond stylus and wherein said supporting means comprises an air puck, said air puck having said surface which is maintained parallel to a surface of said substrate.

6. Apparatus according to claim 5 wherein said means for adjusting said given nominal depth comprises a lever for changing the position of said surface of said air puck relative to said tip of said diamond stylus.

7. Apparatus according to claim 6 further comprising:
   an oil damping means coupling said base to said first mounting block.

* * * * *